United States Patent [19]

Audretsch, Jr. et al.

[11] 3,742,452

[45] June 26, 1973

[54] SELECTIVE POLLING OF TERMINALS VIA A SEQUENTIALLY COUPLED BROADBAND CABLE

[75] Inventors: Leo M. Audretsch, Jr., Poughkeepsie; Burtt E. Bliss, Hyde Park; James T. Dervan, III, Salt Point; Matthew Elsner, Poughkeepsie, all of N.Y.; Leroy E. Griffith, Boulder, Colo.; Robert A. Thorpe, Poughkeepsie, N.Y.

[73] Assignee: International Business Machines, Corporation, Armonk, N.Y.

[22] Filed: Oct. 29, 1971

[21] Appl. No.: 193,829

[52] U.S. Cl. .......................... 340/147 R, 340/163 R

[51] Int. Cl. .......................... H04j 3/02

[58] Field of Search .......................... 340/147 R

[56] References Cited

UNITED STATES PATENTS 3,483,329 12/1969 Hunkins .......................... 340/147 X

*Primary Examiner*—Harold I. Pitts

*Attorney*—Robert Lieber et al.

[57] ABSTRACT

Multiple terminals linked to one broadband cable in a sequence are interrogated by directionally coupled configuring signals and service polling signals. Configuring signals are utilized to permit selectively participating terminals to order themselves into service polling groups. Service polling signals offer successive terminals in a polling group exclusive access to a facility shared by all terminals of the group (e.g. time or frequency channel on the cable) which has not been seized by a preceding terminal of the group. Isochronal feedback shifting techniques are employed in the configuring and polling selection processes. Participating terminals progressively attach supplementary signals to the configuring and service polling signal trains "on-the-fly", without otherwise modifying or delaying the trains, by isochronally matching the signals of the passing train, extrapolating the supplementary signals and transmitting the supplementary signals immediately behind the end of the passing train through appropriate directional transmission coupling to the cable.

20 Claims, 12 Drawing Figures

INVENTORS
LEO M. AUDRETSCH, JR.
BURTT E. BLISS
JAMES T. DERVAN, III
MATTHEW ELSNER
LEROY E. GRIFFITH
ROBERT A. THORPE

BY Robert Lieber

ATTORNEY

SELECTIVE POLLING OF TERMINALS VIA A SEQUENTIALLY COUPLED BROADBAND CABLE

BACKGROUND OF THE INVENTION

1 Field of the Invention

The invention relates to selective polling of terminals coupled to a guided transmission medium in a positional sequence.

2 Description of the Prior Art

Known sequential polling systems appear to be classifiable as "specific address" systems and "modify and pass-on" systems. The first class would include systems in which interrogation and response signals are transferred alternately between a master station and individual terminals in a sequence; the process terminating when a terminal response indicates need for service. In the second class would be systems in which terminals in a positional sequence successively receive interrogations, modify the same with delay in handling and pass results on to succeeding terminals; the modifications explicitly or implicitly identifying the status of the preceding terminals (acceptance or rejection of service).

Systems in the first class are characteristically slow and inefficient since each terminal is delayed by detection and response activities of preceding terminals and repetitious interrogation transmission activities of the master station.

Systems in the second class are somewhat more efficient inasmuch as each master interrogation transmission effectively extends to all terminals. However each active terminal introduces active circuit delays in their receive and modify interrogation functions. Also it is somewhat cumbersome to add or remove terminals in this type of system.

The present invention is a system of interrogation designed for more efficient sequential interrogation of terminals than systems in the above classifications which is also adaptive quite simply to insertion and removal of terminals. The present system also has selective masking features and inherent error-checking properties providing additional advantages over known earlier arrangements.

BRIEF SUMMARY OF THE INVENTION

Systems contemplated herein engage in two distinct sequential interrogation activities hereinafter designated configuring and service polling. The configuring process establishes a service polling group relationship between sequential terminals attuned and responsive to a distinctive configuring poll (CNFG POLL) transmission. The service polling process enables terminals of a configured polling group to exclusively access a shared facility (e.g. time or frequency channel) in response to a distinctive service poll (SVC POLL) transmission.

The configuring and service polling processes hereof involve isochronal activities and timing relationships between terminals. In each instance a directionally propagated linear code representation serving as a partial interrogation transmission is progressively augmented, without delay and without modification, as it passes coupling junctures between participating terminals and the transmission medium (e.g. cable). Internally the participating terminals extrapolate unique supplementary transmission functions by linear feedback shifting and correlation matching operations. Terminals selectively concatenate respective extrapolations, as ongoing selective transmissions, immediately adjacent the end of the passing transmission. The concatenated signals are interpreted by succeeding terminals as status indications of the previous terminals.

In the configuring and service polling operations the concatenated transmissions expand the original poll signal in proportion to the number of participating terminals. The original polling interrogations are encoded in a predetermined linear code work form. As the polling transmission passes respective terminal coupling positions on the interrogation transmission medium (e.g. cable) participating terminals (the meaning of "participating" will become clear from a reading of the detailed description provided hereafter) which do not need service send as ongoing concatenated transmissions representations of respectively positioned bits of the linear code word. Correlation matches "downstream" indicate implicitly the status of previous terminals in respect to configuration ordering or appropriation of a shared facility (e.g. time or frequency channel); whereby in the latter instance only one terminal of a configured group will be able to use the shared facility at any time.

The master station which originates the basic (unaugmented) service polling (SVC POLL) transmissions is adapted to vary the form and length of the basic transmission in a manner adapted to achieve selective exclusion of a variable subset of terminals of the configured group and thereby prevent "lock-out" conditions. Selective exclusion is achieved by modifying a variable length initial portion of the basic SVC POLL transmission and adapting the configured terminals to mask out of respective correlation operations initial lengths of the basic transmission selected according to respective configuration positions. In effect this simulates to the configured terminals which do not mask the modified SVC POLL segment, appropriation of the shared facility by preceding terminals. Remote configured terminals which correlate only upon unmodified portions of the basic SVC POLL transmission and supplementary concatenated transmissions are unaffected by the exclusion modifications and are therefore able to accept service by selecting appropriate extrapolation responses.

The foregoing and other features, aspects and objectives of the present invention may be more fully understood and appreciated by considering the following description and claims.

DETAILED DESCRIPTION

Introduction

Figure 1:
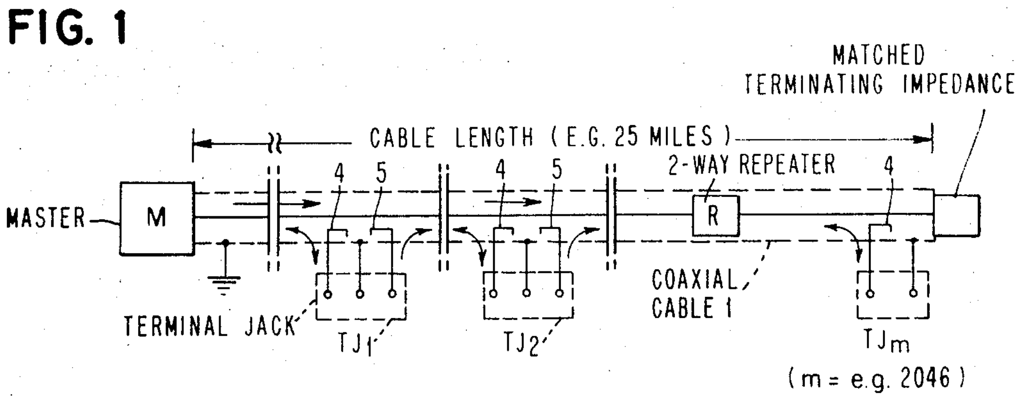
FIG. 1 is a schematic illustration of a system of guided transmission comprising a master station, a guided transmission medium (broadband cable), and multiple terminal jacks receptive to plug-in connection with terminal equipment constructed according to the present invention; this system representing the typical operating environment of the invention.

The present invention contemplates as typical a length of transmission medium (e.g. cable) on the order of 25 miles supporting wide band communications between a master station (central computer) and on order of 1000 satellite terminals (243 microsecond transmission time over the 25 mile distance assuming 75 ohm cable). With following assumptions and specifications the potential efficiency of the present polling technique may be demonstrated.

Assumptions and Specifications 1. 50 kilobit per second transmission bit rate for interrogation pulses (i.e. 20 microseconds per bit);
2. 1000 terminals having equal distribution of transponding activity relative to the polling master station;
3. The terminals spaced at uniform intervals over the 25 mile transmission path; and
4. At least one terminal having a response message for the master (i.e. needing service) in each service polling interval.

Example 1

Alternate interrogation/response polling; two transmissions per terminal (master to terminal interrogation and terminal to master status response). Average transmission distance under foregoing assumption conditions would be one half of 25 miles. Therefore average transmission time would be one half of 243 microseconds or 121.5 microseconds. Assuming that on the average 500 terminals must be polled to identify one which needs service then 2 × 500 or 1000 discrete transmissions are required to complete an average polling sequence. The average transmission propagation time for this would be 121.5 × 1000 microseconds or 121.5 milliseconds. Assuming that each transmission consists only of a terminal address (which should be representable by 10 bits having 1,024 permutational states) and allowing 20 microseconds per bit, an average interrogation sequence would require at least 10 bits × 20 microseconds per bit × 1000 transmissions per average polling sequence or 200 milliseconds of message time. Adding this to the 121.5 milliseconds average sequence propagation time it is seen that an average of 321.5 milliseconds would be needed to identify one terminal requiring service.

Example 2

For terminal-to-terminal "modify and pass on" polling the same average of 500 terminals would be polled in an average sequence establishing one needing service. Assuming again 10 bits per terminal address and 20 microseconds per bit, 500 terminals should require 10 × 20 × 500 or 100 milliseconds of average time for representation of the polling messages. Additional handling time must be allowed for each terminal not requiring service to detect its address and generate the address of the next terminal. Allowing 5 bit times per terminal for this "next address" generating function additional time of 5 × 20 × 500 or 50 milliseconds should be required per average interrogation sequence. This added to the 100 millisecond average above and the 121.5 microseconds propagation time through the 12.5 mile average cable length produces a total figure average of 150.1215 milliseconds per average polling sequence.

Example 3

With the polling technique presently contemplated 1,023 terminals would require origination by the master of a single basic polling message 1,023 bits in length received on the average by 512 participating terminals concatenating 512 additional bits. This represents average message bit length of 1535 bits. Multiplied by 20 microseconds per bit we obtain 30.7 milliseconds as the average message time. Add to this transmission delay of 121.5 microseconds to the average terminal needing service and the total becomes 30.8215 milliseconds. This total is seen to be significantly less than totals of 150.1215 and 321.5 milliseconds obtained in the first two examples above.

Environmental System (FIGS. 1–4)

Referring to FIGS. 1–4 the typical operating environment of the subject interrogation invention may be appreciated. Coaxial cable 1 is adapted for bidirectional transmission of signals between spaced terminal jacks TJ1-TJm and a master station M. Typically the master station may be linked to a data processing installation (computer, memory bank, etc.) and/or a television signal distribution facility and the terminal jacks may be viewed as adapted for plug-in attachment of ordinary television receivers containing keying and transponding facilities useful to initiate transmission to the master and to more remote sequential terminal positions.

Typically the master station and the individual terminal jacks are coupled to the cable via directional couplers 4,5. The system contemplates a fairly large number (*m* greater than 1000) of terminal jacks and directional coupling structures located at intervals along a fairly long length of cable (on the order of 25 miles). A typical operating environment could comprise a master antenna broadband cable installation running sequentially through successive offices on successive floors of a large building structure; the front end coupling to central distribution apparatus (master station) serving to distribute information, polling signals and other transmissions to the terminal coupling jacks and to receive transponded messages from a group of terminals one at a time over a single communication channel shared by the group. Naturally, the master and terminals may themselves be hierarchical substations of branch distribution and collection systems serving to connect groups of terminals in respective branch systems with a "trunk" line such as 1.

Repeaters R (FIG. 1), are provided at suitable intervals along the line between groups of terminal jack positions, in order to maintain adequate signal levels in both directions of transmission. These are not described specifically herein being well known in the art and forming no part of the present invention.

Multiple distribution systems with directional coupling structures of the type symbolically indicated in FIG. 1 have been extensively treated in the patent literature on this subject and are well known in the art. Representative patents and publications illustrating structures suitable for use in this fashion include U. S. Pat. No. 2,531,438 (granted Nov. 28, 1950 to W. J. Jones and references cited therein.

Directional couplers 4 provide coupling between respective terminal jacks TJ and the cable 1 in the direction of the master station. These couplers thereby direct transmissions from the master to respective terminals and transmissions of respective terminals back to the master.

Similarly couplers 5 provide coupling between respective terminals and the cable 1 for transmissions directed away from the master whereby each terminal may originate ongoing transmissions to the more remote terminals.

Figure 2:
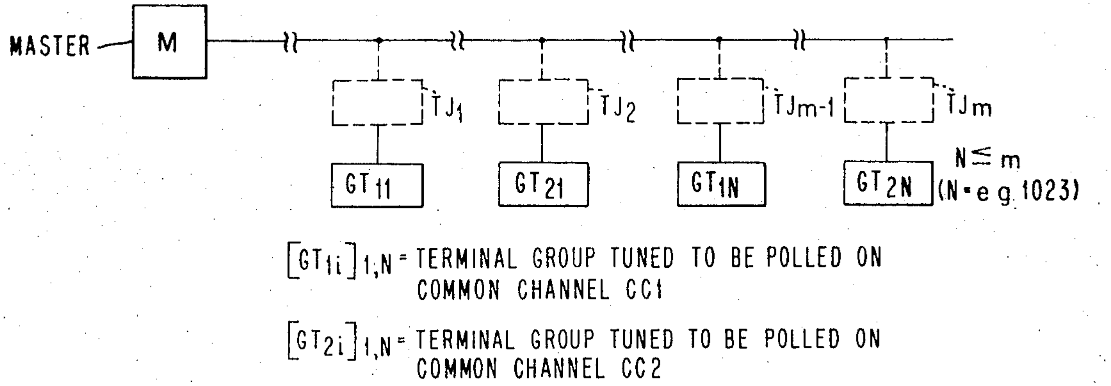
FIG. 2 illustrates typical group ordering of attached terminal equipments in the environmental of FIG. 1.

FIG. 2 illustrates how terminal equipment GT can be grouped for attachment to the various terminal jacks TJ of FIG. 1 for sequential interrogation and transponding operations. As shown in this drawings alternate terminal equipments are assigned to first and second terminal polling groups [GT1i] ($i$=1–N) and [GT2$i$] ($i$=1–N) receiving polling interrogations on respective polling channels CC1 and CC2. An exemplary value of N for $m$ = 2046 would be 1023. This then shows how multiple terminals, for example 2046, can be grouped for interrogation polling in accordance with the inventive method and circuits described hereafter.

As the description proceeds other groupings and subgroupings of the various terminals for interrogation communication will be readily apparent to those skilled in the art. For instance if $m$ = 1023 all terminals attached to the terminal jacks would be grouped as one group for receiving interrogation processing in accordance herewith (i.e. N=1023).

Figure 3:
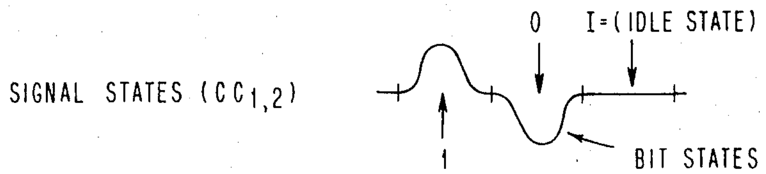
FIG. 3 is a waveform diagram illustrating schematically the signal states of the channel utilized for terminal interrogation.

FIG. 3 indicates the form of polling signals carried in the above-mentioned polling channels. In each basic interval of operation said channels are each driven to one of three distinct states of energization designated 1, 0, and I. The polling channel normally remains in the idle or inactive state I until the master directs a polling transmission message of 1 and 0 binary information elements to the terminal junctures. At such times, depending upon whether the transmission is carried in CC1 or CC2 a select configuration subset of the group [GT1$i$] or [GT2$i$] will receive and react to the transmission by selectively appending directed ongoing transmissions.

Figure 4:
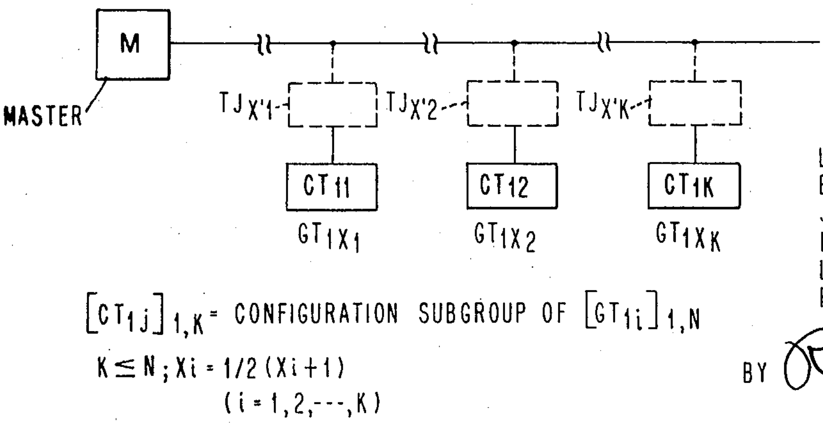
FIG. 4 illustrates a configured subgrouping of interrogatable terminals in the environment of FIG. 1.

As indicated in FIG. 4 select configuration subsets of terminals receiving on CC1 in this manner may be denoted [CT1$_j$] ($j$=1,2 . . ., K; K less than or equal to N). FIG. 4 also indicates that the individual terminals CT of such configuration subsets (or subgroups) belong also the the larger group GT1 in which their ordered positions are different. Thus the subgroup may also be denoted by [GT1$x_j$] ($j$=1,2, . . ., K; $x_j$ representing increasing integers).

As previously mentioned terminals herein are adapted to participate on a selective basis in two distinct types of interrogation operations; respectively associated with distinction and augmentation of configuration polling (CNFG POLL) transmissions and service polling (SVC POLL) transmissions. The configuration polling process serves to establish a subgroup of participative terminals which thereafter receive and selectively augment the SVC POLL transmissions. The service polling operation enables successive terminals in the configuration subgroup CT to establish access to a facility shared by all members of the subgroup (e.g. a transponding channel of communication back to the master). In the preferred form of service polling, hereafter termed selective service polling the form of the basic SVC POLL message originated by the master is instrumental in masking the availability status of the shared facility from certain terminals of the configuration subgroup while permitting other terminals of the subgroup to accept service.

Terminal Circuits for Configuration Polling

Figure 5:
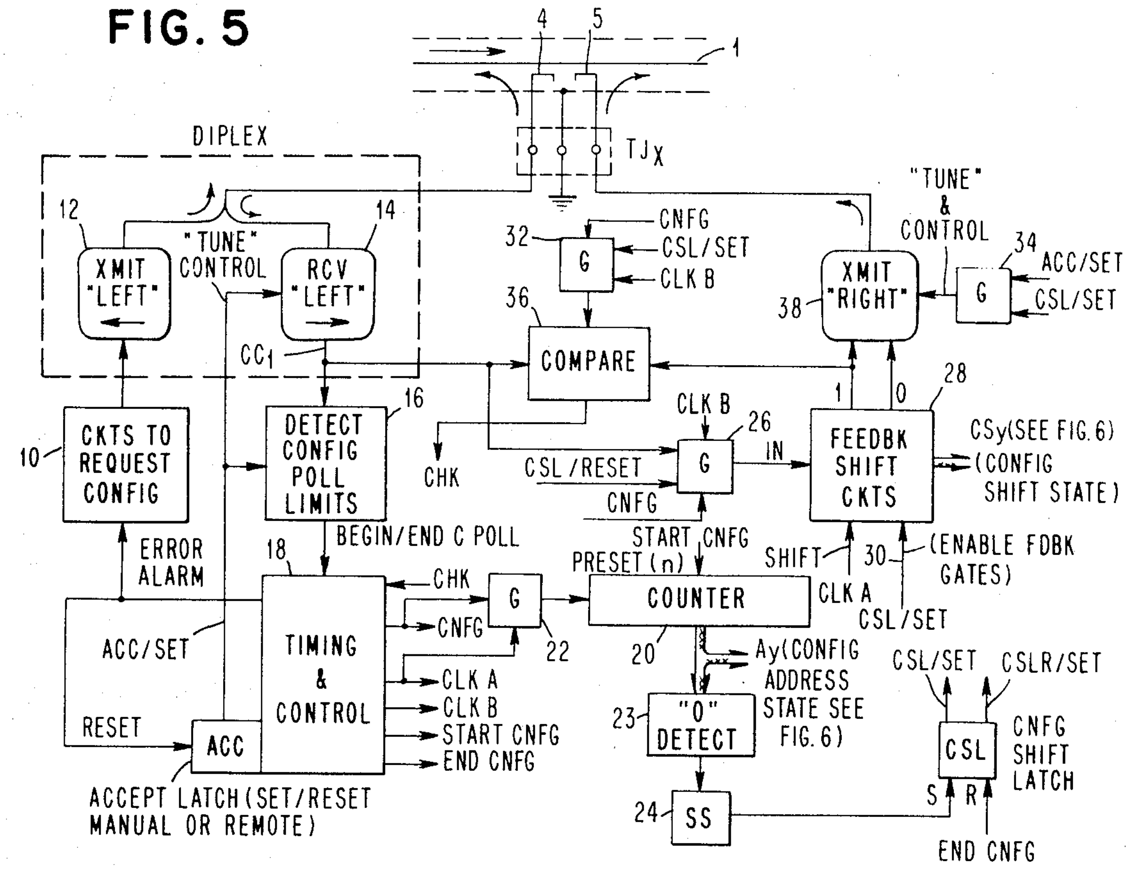
FIG. 5 is a schematic block diagram of terminal circuits in accordance with the subject invention for receiving and responding to configuring interrogations (CNFG POLL)

FIG. 5 illustrates configuring circuits for terminal GT1y ($y$=1,2, . . . ,$N$) attached to corresponding odd-ordered jack position TJ$x$ ($x$=2$y$–1) in the environmental system of FIG. 1. The master station transmission of the initial CNFG POLL may be initiated either by terminals (i.e. in order to request assignment to or release from active service polling status in a configuration subgroup) or by the master station (e.g. after diagnosis of unusual terminal transponding activities as potential system failure).

For the purpose of enabling the individual terminals to request CNFG POLL transmission distribution from the master, request circuits 10 operate transmitting circuits 12 to transmit a request signal through coupler 4 in the direction of the master station. This request signal may be carried in any pre-arranged form upon any channel other than CC1 or CC2.

When master station apparatus (not shown) receives a request to initiate CNFG POLL transmission for group [GT1y], or decides on the basis of other information that configuration re-ordering is needed, it sends a basic binary coded CNFG POLL message via CC1 which is received directionally at terminal receive circuits such as 14. Detection circuits 16 detect the leading edge of the first received binary element of the CNFG POLL sequence distinguishing such from any preceding header or flagging information sent by the master (e.g. flag to distinguish CNFG POLL transmissions from SVC POLL transmissions). Circuits 16 also detect the return of CC1 to the I (idle) signal state (see FIG. 3) after the last binary element of CNFG POLL transmission.

Accept Latch ACC enables circuits 14 and 16 relative to channel CC1. In the set state (ACC/SET), established either by local switching at the terminal or by remote action of the master over the cable latch ACC permits reception on CC1. In the reset state (ACC/RESET), which is also subject to local or remote establishment, ACC blocks reception of interrogation transmissions. Thus, only terminals which have respective latches ACC in SET condition will be receptive and responsive to interrogations sent by the master.

Timing and control circuits 18 receive the detection outputs of circuits 16 (indicating the start of the first binary element and end of the last element of augmented CNFG POLL transmission) and release timed signals denoted CNFG, START CNFG, END CNFG, CLK A and CLK B. Form and timing of these signals is indicated generally in FIG. 7.

Figure 7:
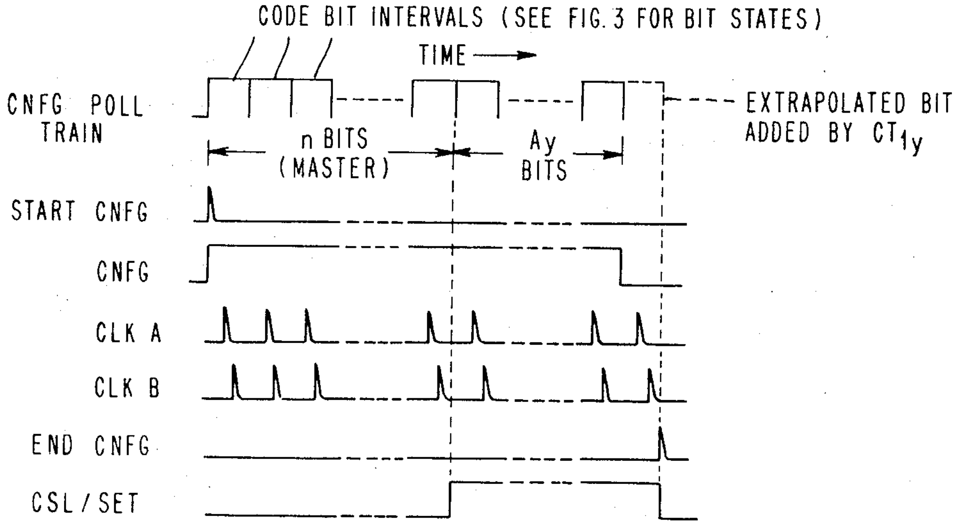
FIG. 7 contains a series of time related waveform diagrams characterizing the timing of signals and operations of the circuits shown in FIG. 5.

As shown in FIG. 7 the master sends an $n$ bit CNFG POLL transmission with a not shown header or flag signal (for the particular case of $N=1023$ mentioned above, $n=10$) and CNFG is a step function in each terminal spanning these n bits and any additional bits which may be appended by preceding terminals. It should be pointed out that the header or flag signal must be distinguishable from the n CNFG POLL: e.g. by an intervening interval of idle condition in the channel CC1 or by other condition enabling the detection circuits to distinguish the first of the $n$ bits. The intervening idle interval is not required if another channel is available to convey the flag indication or if CC1 can sustain a condition distinguishable from the states 0, 1 and I shown in FIG. 3.

START CNFG is a short duration pulse coinciding with the rise of CNFG. The start CNFG pulse is utilized to preset a binary counter 20 to an initial state corresponding to $-n$.

A and B cyclic clock pulses CLK A and CLK B (B pulses lagging A pulses) are released starting at a predetermined time after the START CNFG pulse. The clock cycles correspond in duration to the durations of the CNFG POLL bits and the clock pulses are timed to coincide with desired mid-position sampling phases of the poll bits. A clock pulses transfer conditionally through gate 22, prepared by CNFG, to the incrementing input of counter 20; thereby increasing the count by unit increments in synchronism with receipt of respective CNFG POLL bits. When the counter reaches 0 state detect circuit 23 (e.g. an AND gate) operates single shot 24 to generate a setting pulse input to a previously reset Configuring Shift Latch CSL. It will be noted that due to the presetting of counter 20 to $-n$ occurrence of the 0 count state coincides with reception of the nth bit of configuring code (i.e. the last bit sent by the master). The setting of CSL (to state CSL/SET) is timed to coincide with arrival of the terminal portion of the nth CNFG POLL bit for reasons which will be apparent hereafter.

As counter 20 advances to the 0 state latch CSL (then in state CSL/RESET) and CNFG prepare gate 26 to sample the n bits of the master transmission in coincidence with the B clock pulses. Output of gate 26 is sent to a first shift stage of an n stage feedback shifting unit 28 which is shifted by the A clock pulses. The feedback gates of circuits 28 are disabled while CSL is in state CSL/RESET so that the $n$ master bits are merely serially shifted into successive shift stages of circuits 28 without feedback.

Upon establishment of CSL/SET the input gate 26 is disabled and the feedback gates of shift circuits 28 are enabled in preparation for linear feedback shifting operation of circuits 28. CSL/SET also prepares gates 32 and 34 for operation of respective compare circuits 36 and transmitting circuits 38 respectively. Gate 32 prepared by coincidence of CSL/SET and CNFG transfers B clock pulses useful to sample the state of compare circuits 36 during feedback shifting of circuits 28 (in all but the last feedback shift cycle). Circuits 36 compare CC1 output of receiver 14 with nth stage output of feedback shift circuits 28. When the transferred B pulses sample a matched comparison condition in circuits 36 line CHK remains in a normal (unchanged) condition. If a mismatch condition is sampled line CHK is pulsed transferring error indication to control circuits 18.

Circuits 18 are equipped to respond to the CHK pulse as indication of potential system failure. The CHK pulse is used to derive an "early" END CNFG pulse (END CNFG normally occurring one bit period after detection of the end of the incoming CNFG POLL train; i.e., one period after CC1 returns to I state). This early pulse is used to reset CSL (ending the terminal configuring operation) and to generate "Error Alarm" function useful to reset ACC and transmissible to the master station via operation of configure request circuits 10. The master may at this stage execute diagnostic procedures which are not relevant to the present discussion.

Assuming no mismatches are detected by circuits 36 the feedback shift function continues until latch CSL is reset by the normally times END CNFG pulse. Referring to FIG. 7 CNFG normally terminates with the last incoming bit of the CNFG POLL train on CC1 while the A and B clocks proceed to run for one more bit cycle terminating at END CNFG. END CNFG also resets Latch CSL disabling gates 34. While gates 34 are enabled by CSL/SET the feedback shift state of e.g. the nth shift stage of circuits 28 is coupled to transmitting circuits 38 producing 1 or 0 state signals in CC1. These signals are directionally coupled to the cable in the direction of the more remote terminals via coupler 5. The isolation between coupler 5 and coupler 4 should be sufficient to prevent "right to left" crosstalk from "right" transmit circuits 28 to "left" receive circuits 14.

Transmission circuits 38 are energized by CSL/SET for the complete interval of normal (no error) feedback shifting. Thus, the terminal contribution to the cable signal on CC1, via circuits 28 and coupler 5 (assuming perfect correlation and appropriate design of coupling path length), should directly match and superimpose over the pre-existing bit signals in CC1 propagating along the cable; except for the additional bit cycle between the end of CNFG and END CNFG. In the latter additional bit cycle the signal in CC1 on the cable is a unique product of the subject terminal GT1y. Since CSL/SET spans the extended feedback shift sequence of the respective terminal it will be appreciated that the contributions of successive terminal transmit circuits 38 and couplers 5 comprise successive bit representations of the feedback shift code.

Considering then that all terminals in [GT1$i$] are identically equipped with circuits as in FIG. 5 it will be understood that only terminals GT1y having respective ACC latches conditioned to state ACC/SET will receive and respond to the master CNFG POLL transmission. The response of each terminal internally will be a feedback shift sequence commencing upon receipt and input shifting of the nth bit of the master transmission and terminating after Ay feedback shifts; Ay corresponding to sequential positions on the cable of the responding terminals. Thus each terminal with ACC/SET will concatenate an additional respective feedback code bit to the ongoing transmission in CC1. Accordingly it will be appreciated that the final "address" state Ay of counter 20 and "configuration shift" state CSy shift circuits 28 in each responding terminal will be uniquely related to terminal position in he responding subgroup [GT1Aj].

The form and nature of such feedback shift functions and associated linear codes has been generally described by J. E. Meggitt in U. S. Pat. No. 3,162,837 granted Dec. 22, 1964 to J. E. Meggitt and by W. W. Peterson in "Error Correcting Codes" MIT Press (1961). Accordingly the ensuing description will concentrate upon the generation and usage of particular cyclically recurrent codes of length $N$=1023, for the exemplary application of subject interrogation processes.

Terminal Circuits for SVC POLL Reception and Response

Assuming then that a subgroup of the terminals of group [GT1$i$] has been configured as described above, by establishment of shift states CSy and address count states Ay, and assuming further that ACC latches in the same subgroup of terminals remain respectively conditioned to state ACC/SET, the associated subgroup is eligible to participate in the service polling function next described in which the participating terminals determine availability of a shared facility (e.g. cable frequency or time channel) for accepting terminal communications to the master station. In other words the service polling process permits the master station to interrogate the configured subgroup or a subset thereof and receive from the first eligible participant terminal which needs service a transpondent message carried via the shared channel facility.

This process, viewed in the context of a master antenna radio and TV distribution system with transponding equipment in each receiver, would enable multiple receivers to communicate with master distribution apparatus via the interrogation channel CC1 and the shared facility.

Figure 6:
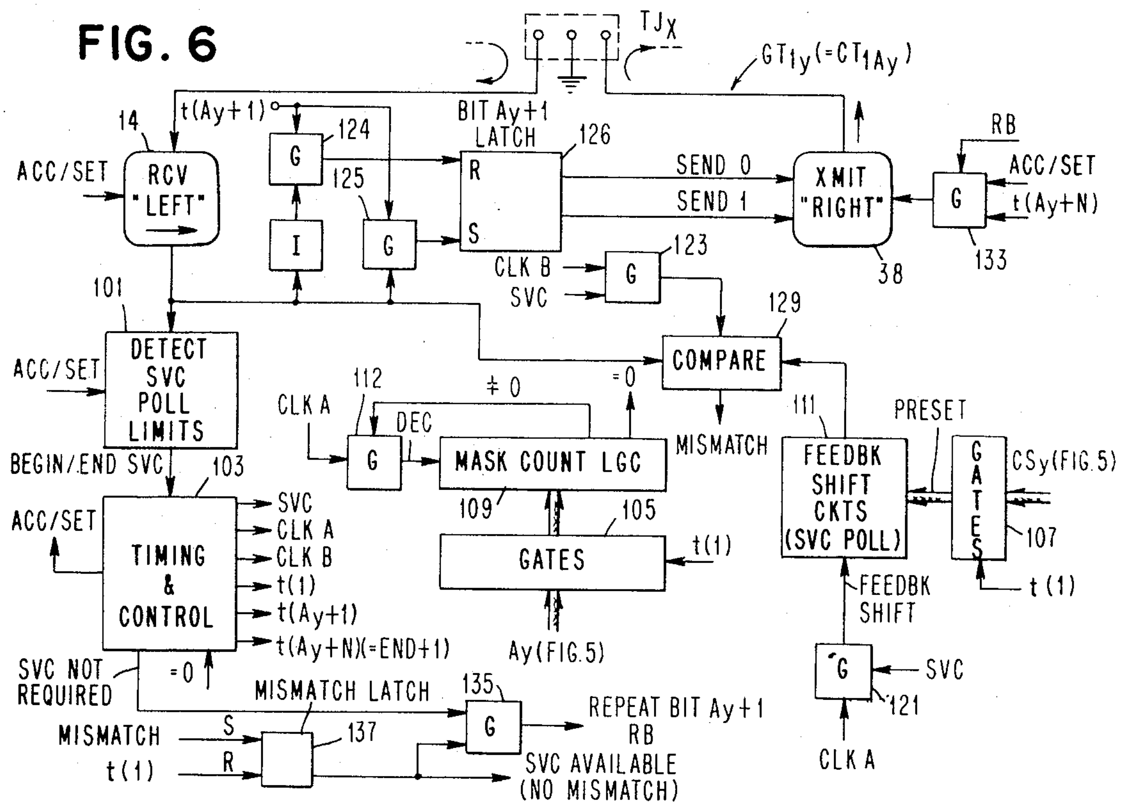
FIG. 6 is a schematic circuit diagram of terminal circuits in accordance herewith for receiving and responding to service polling (SVC POLL) interrogations.
Figure 8:
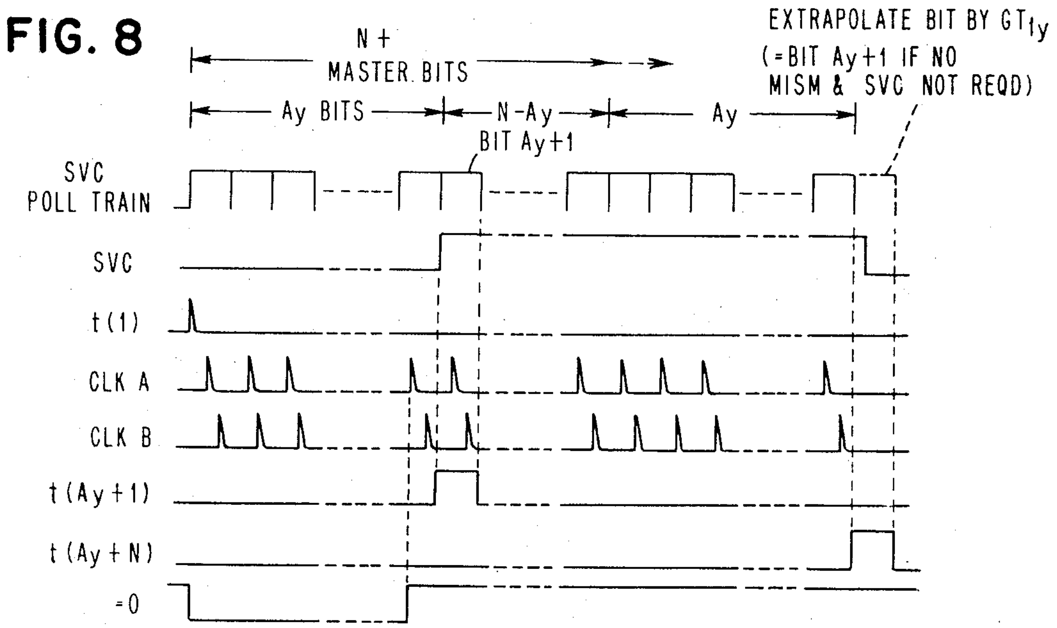
FIG. 8 contains a series of time related waveform diagrams characterizing the timing of signals and operations of the service polling circuits of FIG. 6.

Referring to FIGS. 6 and 8 the service polling function begins with transmission by the master of an SVC POLL code signal train and continues with selective concatenation by participating terminals of appropriate extrapolated bit signals. The SVC POLL master transmission essentially comprises a representation of an N (e.g. 1023) bit code word produced by feedback shifting of a feedback shift circuit of the type characterized in the discussion of FIG. 5 above.

The difference between such a code word and the initial $n$ bits sent by the master during the configuring sequence should be understood. The initial $n$ bits sent during configuring (FIG. 5) represent a "seed" state for establishing an initial feedback shift state in the feedback shift system 28. The SVC POLL representation is the product of a feedback shift stage of a "preseeded" feedback shift system such as 28. Thus, in a 1023 terminal system the "seed" length $n$ would be 10 whereas the shift code word length N would be 1023.

Terminals having configured status (ACC/SET and predeveloped representations Ay and CSy) receive the SVC POLL code in the receive circuits 14 and detect first and last bit elements in detect circuits 101. Circuits 101 distinguish between CNFG POLL and SVC POLL representations either by flag information or other signal functions as previously mentioned.

As the first SVC POLL bit appears in CC1 detect circuits 101 transfer "Begin" control to timing and control circuits 103 which immediately produce pulse $t$(1). Gates 105 and 107 operated by $t$(1) transfer respective address and initial shift state "seed" functions Ay, CSy (see FIG. 5) in parallel form into respective counting and feedback shifting units 109, 111. "Begin" also releases cyclic A and B clock pulses CLK A and CLK B which may have the same "bit period" timing as the corresponding functions of FIG. 5.

The A pulses decrement counter 109 through gate 112 prepared by the "count not equal to zero" output state of counter 109. At the end of the bit reception cycle in which counter 109 reaches count state zero lines SVC and $t$(Ay+1) are raised. SVC remains "up" until the "End SVC POLL" condition (CC1 return to I state) is detected by circuits 101; usually $N$ bit cycles. $t$(Ay+1) has a duration of one bit cycle. SVC thereby prepares gates 121 and 123 for N bit cycles. Gate 121 controls feedback shift operation of shift circuits 111 to generate a reference cyclic code representation, and gate 123 controls sampling of the correlation between this reference code and a portion of the SVC POLL code. $t$(Ay+1) prepares gates 124, 125 for sampling the (Ay+1) received bit of the SCV POLL into a bit holding latch 126.

Since counters 109 of successive configured terminals receive respectively different initial count settings Ay and thereby reach 0 count levels at different intervals $t$(Ay+1) respective latches 126 will receive successive (Ay+1) th bits of the SVC POLL transmission. Also, since successive terminals will thereby have SVC control functions starting in successive bit cycles and continuing for N cycles, and the code transmitted in SVC POLL may be a cyclic code repeating at intervals of N bits the bits in latches 126 will be "images" of the code bit belonging in interval $t$(Ay+N).

Thus, during SVC gate 123 samples compare 129 to ascertain correlation between the reference code and the SVC POLL and at $t$(Ay+N) gate 133 prepared by ACC/SET conditionally permits transmitter circuits 38 to operate to transmit the "image" function in latch 126 when permitted by the conditioning input RB. RB is received from gates 135 prepared by coincidence of a "no mismatch" output from mismatch latch 137 and a "service not required" output from control circuits 103. The latter function indicates the status of the respective terminal in regard to need for service. Latch 137 is reset at $t$(1) prior to the shift sequence and becomes set thereafter only upon transferrance of mismatch condition to the "error" line output of compare circuits 129 by operation of gate 123 during the feedback shift correlation matching.

Therefore in the interval defined by $t$(Ay+N) the enabling state of RB indicates perfect previous correlation and current status of service not required. Consequently energization of transmission circuits 38 "repeating" bit Ay+1 (latch 126) at its cyclic recurrence position in the cyclic code transmission occurs only when there is reception correlation and nonrequirement of service. Since the interrogation code is a cyclic code repetitive at intervals of N bits and since the interval between bit Ay+1 and $t$(Ay+$N$) is N bits long the transmission of bit Ay+1 represents extension of the code. The form of the various signals just discussed is indicated in FIG. 8.

To summarize, successive terminals of the configured subgroup have progressively higher initial count states Ay and progressive initial configured shift states CSy. Therefore respective successive mask counters 109 require additional decrements before reaching 0; i.e., before reference generation and comparison operations. Thus successive configured terminals mask or ignore progressively longer segments of respectively received SVC POLL transmissions in respective correlations. Since terminals also energize respective transmission circuits 38 in respective successive extrapolation intervals $t(Ay+N)$ upon the joint condition that service is not needed and perfect correlation matching has been detected in respective correlations it may be appreciated further that if the original SVC POLL code transmission from the master is exactly N bits in length the first terminal requiring service or detecting a correlation mismatch condition will fail to append the signal to the ongoing SVC POLL transmission (i.e. CC1 will return to the idle condition in respective interval $t(Ay+N)$ and prevent all subsequent terminals from accepting service, i.e. cause all succeeding configured terminals to detect END SVC POLL condition before completing their correlations.

Now if instead of N bits of original SVC POLL the master station transmits N+Ay1 bits with all but the first Ay1 bits correctly coded in the desired cyclic code and with the first Ay1 bits "miscoded" in the form of the complement of the appropriate code bits the first Ay1 configured terminals will fail to mask out the miscoded bits and therefore will perceive correlation mismatches. However succeeding terminals will mask the "miscoded" initial Ay1 bits and be enabled to perceive correlation and accept service. Thus, by extending the master transmission Ay1 +N bits (Ay1 variable) of the basic N bit code the master can selectively exclude from the shared service channel the first Ay1 terminals of the configured participative subgroup. This feature hereinafter is designated selective polling.

Figure 12:
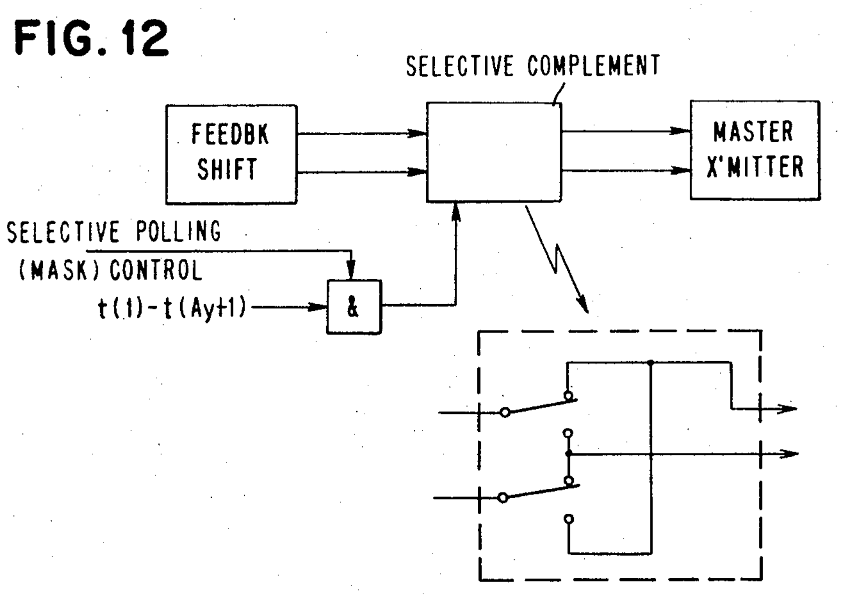
FIG. 12 illustrates schematically the feedback shift organization of the master station in the subject system for selective SVC polling operations.

To enable the master station to selectively extend the basic N bit code word polling sequence and to permute the first Ay1 bits of the basic sequence requires only that the master be equipped with linear feedback shift circuits capable of generating the basic length N code repetitively and with appropriate circuits for selectively complementing and transmitting selectively either the true or complement of an initial portion of the generated code. This arrangement of linear feedback shift generation is illustrated in a schematic form in FIG. 12. The operation of the arrangement in FIG. 12 should be apparent.

Figures 9, 10:
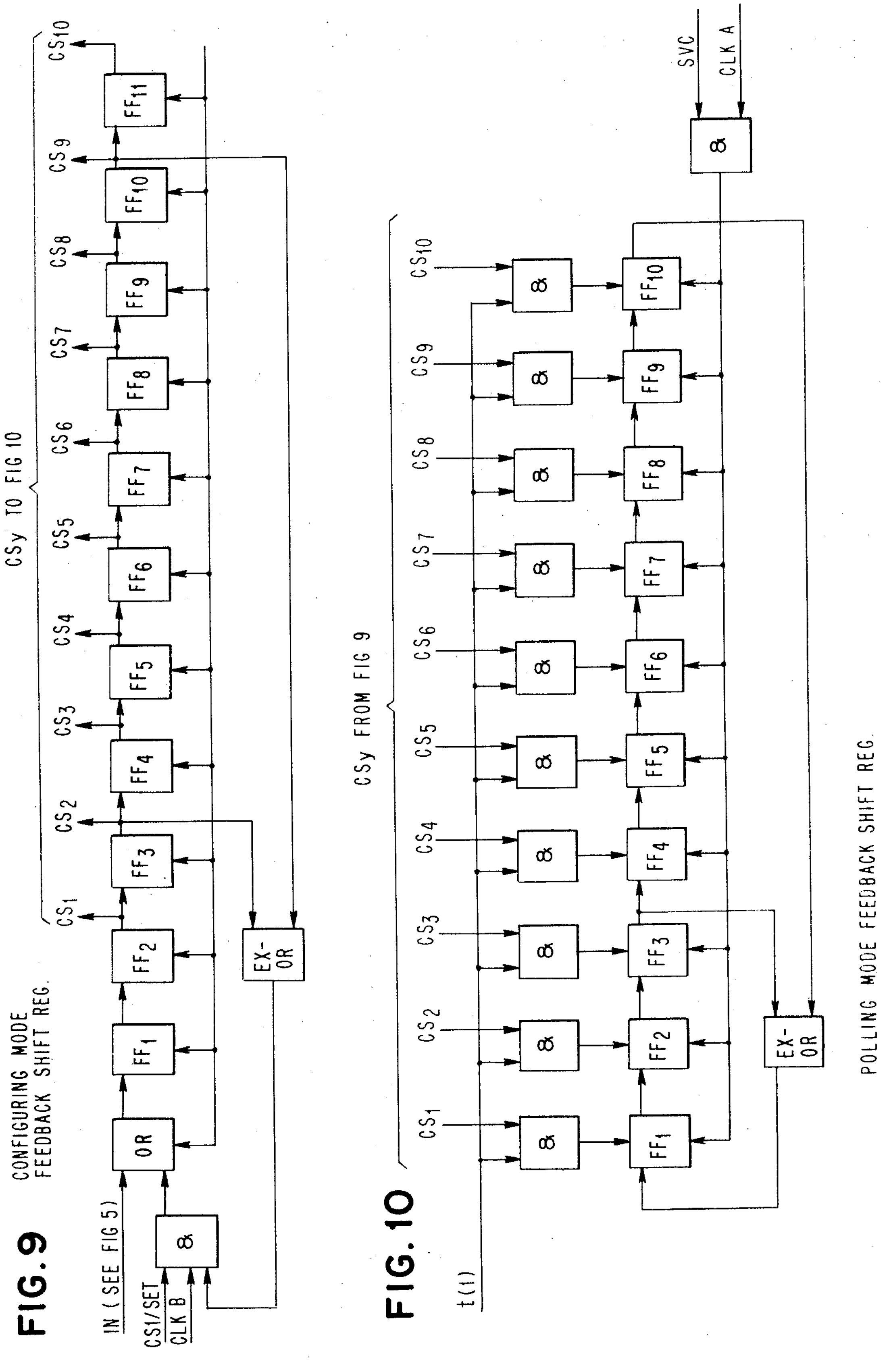
FIGS. 9 and 10 illustrate schematically feedback shift circuits for generating linear code sequences of length 1,023 in respective block sections of the configuring and service polling circuits of FIGS. 5 and 6.

Feedback Shift Circuits $n(=10)$ place feedback shift circuits for generating length N=1023 cyclic code words for configuring and service polling operations (FIGS. 5–8) are respectively illustrated in FIGS. 9 and 10. It will be appreciated by those skilled in the relevant art that much of the circuitry in these two figures may be consolidated for circuit economy. However for the sake of clarity, and recognizing that the particular form of these circuits is not relevant to the invention subject of interrogation systems, the circuits are shown as distinct entities.

In the circuit of FIG. 9 an extra (eleventh) stage FF11 is provided to maintain appropriate phase relationship between the retained final state value CSy and the SVC POLL interrogation function. In the circuits of both FIGS. 9 and 10 outputs of 3rd and 10th stage flip-flops are combined in an exclusive-Or circuit and the logical result is applied to the 1st stage flip-flop as the feedback function.

Timing and Control Circuits

Figure 11:
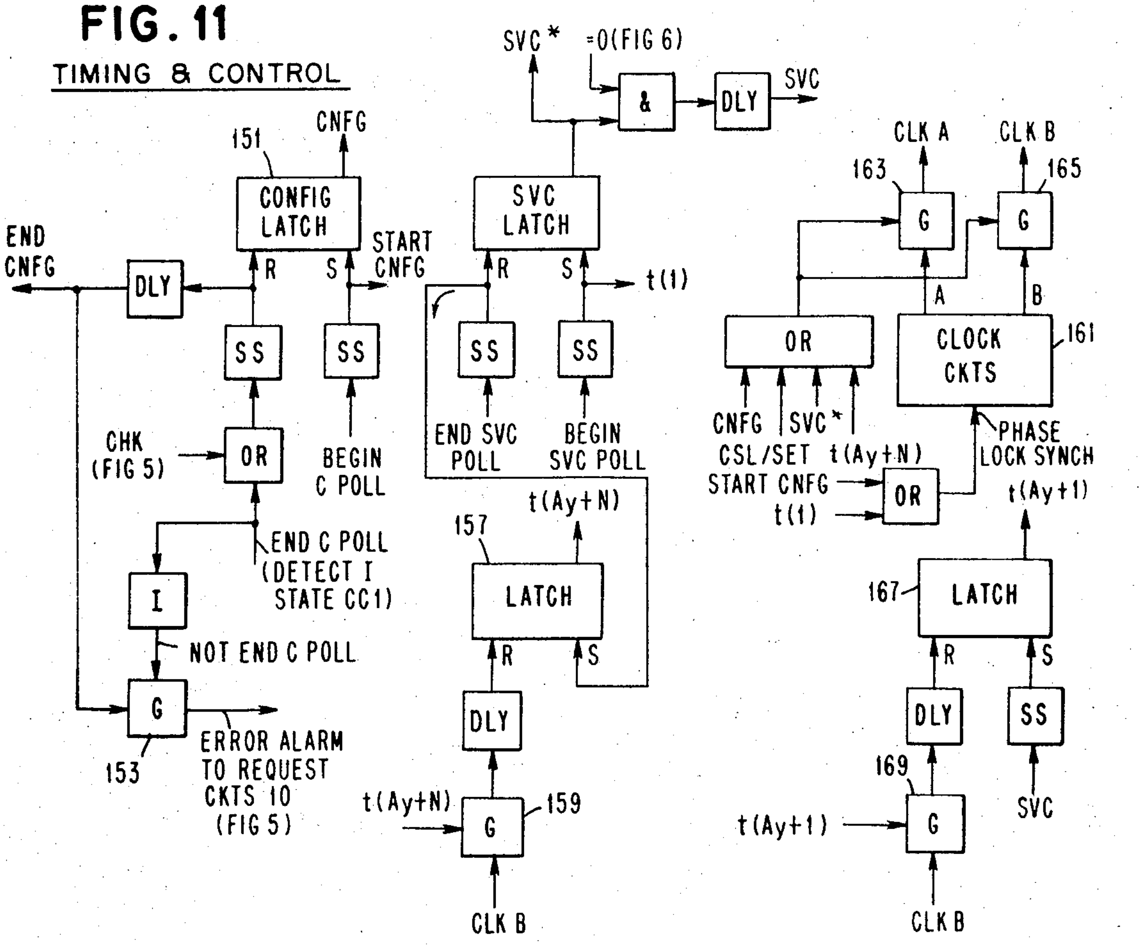
FIG. 11 is a schematic detailing logic and latching elements of the timing and control circuits shown in block form in FIGS. 5 and 6.

The timing and control circuits of FIGS. 5 and 6 are shown in composite in FIG. 11. All elements of timing and control are illustrated.

Latch 151 (source of CNFG, FIG. 7) is set by "Begin C Poll" (from detect circuits 16, FIG. 5) and reset by either "CHK" (from compare circuits 36, FIG. 5) or "End C Poll" (from circuits 16, FIG. 5). Single shots SS provide the requisite form of setting and resetting pulses. The setting input is also useful as START CNFG (see FIGS. 5 and 7). The resetting pulse is delayed through delay circuit D1y to provide END CNFG and gating input to gate 153 prepared by the logical inverse of "End C Poll". Resetting pulses derived from "CHK" are passed to "Error Alarm" input of request circuits 10 (FIG. 5) via gate 153.

SVC latch (indirect source of SVC FIG. 8) is set by pulses derived from "Begin SVC POLL" and reset by pulses derived from "End SVC POLL" (see detect circuits 101, FIG. 6). Appropriate setting and resetting pulses are produced by single shots SS. The setting pulse is also used as $t(1)$ (see FIG. 8) and the resetting pulse is applied to setting input of latch 157; source of $t(Ay+N)$. Latch 157 is reset by delayed B clock pulse output of gate 159 prepared by $t(Ay+N)$. SVC SET (SVC*) and "=0" are Anded and delayed to produce SVC.

A, B clocks are derived from circuit 161, the latter comprising an oscillator with A and B phase outputs. The output A and B pulses of circuits 161 are gated by respective gates 163, 165 to the CLK A, CLK B lines. These gates are prepared by an Or function of CNFG, CSL/SET, SVC* (Set Output of SVC latch) and $t(Ay+N)$. The phase lock control of the oscillator section of circuit 161 is the Or of $t(1)$ and "START CNFG".

Latch 167 set by single shot pulse derived from SVC leading edge provides $t(Ay+1)$ at its SET output. This latch is reset after one bit cycle by delayed gating of B clock pulse thru gate 169 prepared by $t(Ay+1)$.

We have shown and described above the fundamental novel features of our invention as applied to a preferred system embodiment. It will be understood that various omissions, substitutions and changes in form and detail of the invention as described herein may be made by those skilled in the art without departing from the true spirit and scope of the invention. It is the intention therefore to be limited only by the scope of the following claims.

What is claimed is:

1. Interrogation receiver/transponder circuitry for communication terminal equipment comprising:
   - a transmission line;
   - a source of acceptance/non-acceptance control signals;
   - a source of service request signals;
   - means coupled in parallel to said line and controlled by said acceptance signals for receiving a directed interrogation transmission carried on said line; said transmission comprising a predetermined sequence of elemental signals; at least a portion of said sequence becoming repetitive after a predetermined number N of successive elemental signals; said receiving means operating without obstructing the further propagation of said transmission to other terminal equipment coupled to said line;
   - means controlled by initial reception operation of said receiving means for producing timing signals synchronous with signal elements of said transmission;

means controlled by said timing signals for synchronously generating a sequence of N internal pattern signals corresponding to a portion of said transmission uniquely associated with the position of the respective terminal in a set of terminals sequentially receiving said transmission, in synchronism with reception of said transmission portion;

correlation means responsive to said timing signals to ascertain correlation of said received transmissions with said internal pattern signals produced by said generating means; and transponder means coupled in parallel to said line and controlled by said acceptance signals, said correlation means, said timing means, said generating means and said service request signals for selectively producing a directed extension transmission having unique timing in relation to said transmission, said extension representing an extrapolated sequential element of said interrogation transmission and forming therewith a composite transmission uniquely indicative of the reception correlation status and service request status of the respective said terminal equipment.

2. Receiver/transponder circuits according to claim 1 wherein said extension transmission is directed in the direction of continued propagation of said interrogation transmissions and is carried in the same time/frequency channel of communication as said interrogation transmission.

3. Circuits according to claim 2 wherein said interrogation transmission comprises a representation of a particular digit sequence in a specific cyclic code and said extension transmission consists of an extrapolated digit element of said code in said particular sequence.

4. Circuits according to claim 3 wherein said extension transmission element is transmitted so as to form said composite transmission without a gap in time relative to the last digit element of the interrogation transmission as the interrogation transmission proceeds in said direction of continued propagation.

5. Circuits according to claim 2 including:

means responsive to said timing signals for producing a selectively timed masking signal; and means responsive to said masking signal to inhibit operation of said correlation means for the time duration of said masking signal.

6. Circuits according to claim 5 including:

means for changeably storing signals having a unique positional correspondence with the position of interrogation reception of the respective terminal equipment in a group of sequentially receptive terminal equipments; and means for applying said stored signals to said masking signal producing means to uniquely control the time duration of said masking signal in accordance with said group position of said respective terminal equipment.

7. In a multiple distribution communication system involving distribution of directed bidirectional transmissions between a master station and multiple terminal stations, the latter arranged in a predetermined order of succession with respect to initial reception of said transmissions and adapted to communicate one at a time with the master station over a predetermined time/frequency service channel shared in common by the terminals, an interrogation system controlled by said master station for allocating said predetermined service channel to individual said terminals comprising:

means in each said terminal for selectively establishing interrogation acceptance/non-acceptance control status in the respective terminal;

means associated with said master station for transmitting directed configuring and service polling interrogation transmission to said terminals in said order of succession over a predetermined time/frequency channel of interrogation transmission;

means in each said terminal operated selectively by respective said status control means having acceptance status for selectively receiving said interrogation signals;

means in each said terminal coupled to respective said receiving means and responsive to reception of said configuring interrogation transmissions to develop and retain a representation of the positional order of interrogation transmission reception of the respective terminal;

means in each said terminal coupled to respective said order representation retaining means and selective receiving means for developing extrapolation response code functions uniquely characteristic of respective said terminals in response to reception of said service polling interrogations;

means in each said terminal for selectively transmitting representations of respective said extrapolation response functions in the direction of succeeding said terminals in the said order of succession of reception; and means in each said terminal responsive to reception of composite transmissions formed by said service polling transmissions in combination with extrapolation response transmissions of preceding terminals in said order of succession for controlling the selective extrapolation response transmission of the respective terminal and the utilization of the shared service channel by the respective terminal.

8. In a sequential interrogation system:

a source of an original interrogation transmission;

multiple terminals adapted to successively receive said interrogation transmission in a predetermined order of reception; said transmission including a representation of at least one cycle of digits of a predetermined cyclic code;

means in each of said terminals for conditionally transmitting supplemental interrogation signals representing successive extrapolated digit element extensions of said original interrogation transmission, to be received by succeeding said terminals in said order of reception;

means in each terminal for manifesting respective service requirement status; and means in each terminal responsive to said received original and supplemental transmission and status of respective status manifesting means for conditioning transmission operations of respective said supplemental signal transmitting means upon reception and correlation of a complete cycle of sequential digits of said cyclic code and status indication that communication service is not required by the respective terminal

9. A system according to claim 8 wherein each said conditioning means includes timing means effective to append respective said supplemental transmissions, without time hiatus, either to the last supplemental transmission of a preceding terminal in said order of reception when such precedent supplemental transmissions occur or, when there is no supplemental transmission, to the end of the original interrogation transmission.

10. A system according to claim 9 wherein said original and supplemental interrogation transmissions are carried in the same time/frequency channel of communication.

11. A system according to claim 10 wherein each said conditioning means includes correlation means effective to generate a serial time representation of a reference interrogation code function and to ascertain correlation in a certain time interval between a segment of the reference function and a corresponding time portion of received original and supplemental interrogation transmissions; release of the respective terminal supplemental transmission being conditioned upon the status of said correlation.

12. A system according to claim 11 wherein said respective correlation means include mask function generating means for selectively determining the said time interval in which said correlation is ascertained in dependance upon the position of the respective terminal in said order of reception.

13. In a communication system:

a uniform continuous transmission medium for conveyance and directed guidance of transmissions;

means supplying an initial interrogation pulse coded transmission of variable form and length to said medium for conveyance therein a particular direction; and a plurality of terminal units coupled successively to said medium and adapted to receive said conveyed interrogation transmission successively without impeding or delaying continued conveyance thereof in said medium and adapted further to selectively supply or not supply extrapolated code transmissions to said medium for conveyance in said particular direction as progressive code extensions of said coded transmission; each said extrapolated transmission having predetermined code significance and time position in relation to the initial transmission and the other extrapolated transmissions and appearing in said medium as an uninterrupted extension in time and code sense of the initial transmission and precedent other extrapolated transmissions.

14. A system according to claim 13 wherein said supplying means and terminal units comprise a network of coordinated but geographically separated transceivers directionally coupled to said medium for transmitting therein in said particular direction time coordinated interrogation transmissions which appear to successive said terminals as one uninterrupted interrogation transmission.

15. In a communication system:

a transmission medium;

an interrogation control unit including a transmitter supplying coded initial interrogation transmissions of finite length for conveyance through said medium; each said transmission containing multiple consecutive elements of a predetermined cyclic code; and a plurality of terminal transceiver units sequentially coupled to said medium through directive relatively isolated receiving and transmitting couplings with said medium; each terminal transceiver being capable of operating in time synchronism with said conveyed interrogation transmissions as the latter are conveyed past respective said couplings in order to extrapolate and selectively transmit additional consecutive elements of said code in said medium in the same direction as said passing transmission; said extrapolated transmissions appearing in said medium as continuous code and signal extensions of precedent extrapolated and/or initial transmissions.

16. A communication system according to claim 15 wherein:

each said interrogation transmission may comprise either a configuring interrogation or a service polling interrogation distinct from said configuring interrogation; and wherein said terminals include individual processing circuits capable of controlling reception of said configuring interrogations and development and transmission in synchronism therewith of respective said extrapolated transmission code element while concurrently developing and storing an ordered configuration status function related uniquely to the number of extrapolated code elements received in consequence of precedent terminal transmissions; and wherein said terminal processing circuits are arranged to respond conditionally to received said service polling transmissions in combined logical dependence upon the configuration status function last stored in the respective terminal, the number of sequential code digits correctly received and the instant service requirement status of the respective terminal.

17. In a communication system:

a terminal unit;

means in said unit for establishing and storing a variable representation of a service poll ordering function (i.e. configuration status) uniquely associated with the position of the respective unit in a set of positionally ordered units;

means in said unit for indicating a service requirement status of said unit;

means communicating with said terminal unit for supplying thereto variable length service polling code transmissions, each having cyclic code significance in select portions thereof; and means in said unit responsive to said variable length transmissions to condition acceptance of service by said unit relative to said communicating means according to a predetermined combinational logic function of the respective stored configuration status indication, the code significance and positional ordering of a portion of said transmission and the said service requirement status indication.

18. In a communication system:

a terminal unit;

means in said unit for storing configuration order representations;

means remote from said unit and communicating with said unit for alternately supplying thereto cyclically encoded configuring signals selectively receivable by said unit, which signals are useful when received to cause said unit to modify the state of said storing means, and cyclically encoded service polling signals of varying code significance and length; and means in said unit for variably conditioning the response of said unit to said service polling interrogations in accordance with a combinational function of the instant state of said storing means and the instance form and length of respective said interrogations.

19. In a communication system:

a terminal unit;

means communicating with said unit for supplying selective service polling pulse code interrogations of variable code form and duration to said unit and for receiving related code responses of selective form from said unit at particular times in relation to initial portions of respective said interrogations;

means in said terminal for conditioning respective said related responses upon the form and code significance of said respective interrogation and upon variable internal status information of the respective terminal; and means associated with said communicating means for selectively varying said interrogations to extend beyond said particular time, to have forms causing said terminal to remain silent at said particular times and to contain in said extended interrogations signals corresponding to and simulating particular responses of said terminal unit.

20. A unit according to claim 19 wherein said interrogations comprise directionally propagated binary signal representations including an end section consisting of a representation of a variable number of successive bits of a cyclic code, and wherein each said terminal response consists alternately of the guided transmission or non-transmission of a representation of the next successive bit of said code in the direction of continued propagation of said interrogation signals; and when said response comprises said next bit transmission it is arranged to occur contiguous in time to the trailing edge of the last bit representation in said end section and to appear in said communicating means as a continuation of said end section.

* * * * *